United States Patent
Takano

(10) Patent No.: US 7,586,893 B2
(45) Date of Patent: Sep. 8, 2009

(54) RADIO COMMUNICATION SYSTEM, RADIO COMMUNICATION CONTROL METHOD, RADIO COMMUNICATION APPARATUS, CONTROL METHOD FOR RADIO COMMUNICATION APPARATUS, AND COMPUTER READABLE MEDIUM UTILIZING A DIVIDED TRANSMISSION FRAME

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 1428 days.

(21) Appl. No.: 10/291,712

(22) Filed: Nov. 12, 2002

(65) Prior Publication Data

US 2003/0091019 A1 May 15, 2003

(30) Foreign Application Priority Data

Nov. 12, 2001 (JP) .............................. 2001-346740

(51) Int. Cl.
- H04J 3/00 (2006.01)
- H04W 4/00 (2009.01)
- H04L 12/413 (2006.01)
- H04W 24/00 (2009.01)

(52) U.S. Cl. .................. 370/348; 370/345; 370/347; 370/338; 370/337; 370/448; 455/452.1; 455/452.2; 455/562.1

(58) Field of Classification Search .................. 370/347, 370/348, 345, 338, 445, 447, 448; 455/452.1, 455/452.2, 562.1
See application file for complete search history.

(56) References Cited

U.S. PATENT DOCUMENTS

| | | | |
|---|---|---|---|
| 4,987,571 A * | 1/1991 | Haymond et al. ........... | 370/445 |
| 5,590,399 A * | 12/1996 | Matsumoto et al. .......... | 455/449 |
| 5,594,738 A * | 1/1997 | Crisler et al. ............... | 370/347 |
| 5,652,752 A * | 7/1997 | Suzuki et al. ............... | 370/330 |
| 5,752,193 A * | 5/1998 | Scholefield et al. ....... | 455/452.2 |
| 6,108,316 A * | 8/2000 | Agrawal et al. ............. | 370/311 |
| 6,144,645 A * | 11/2000 | Struhsaker et al. .......... | 370/280 |
| 6,240,083 B1 * | 5/2001 | Wright et al. ............... | 370/348 |
| 6,504,836 B1 * | 1/2003 | Li et al. ....................... | 370/349 |
| 6,788,702 B1 * | 9/2004 | Garcia-Luna-Aceves et al. .......................... | 370/458 |
| 2002/0136170 A1 * | 9/2002 | Struhsaker .................. | 370/280 |

* cited by examiner

Primary Examiner—Vincent P Harper
Assistant Examiner—Ariel Balaoing
(74) Attorney, Agent, or Firm—Oblon, Spivak, McClelland, Maier & Neustadt, P.C.

(57) ABSTRACT

A radio communication system, a radio communication control method, a radio communication apparatus, a control method for a radio communication apparatus, and a computer program make it possible to minimize the chance of co-channel interference in a multi-cell environment, and also permit free adjustment of an uplink/downlink ratio. The carrier sense region of a terminal wanting an uplink shares the region used as a directional busy tone region for a terminal wanting an uplink, and the region used as a reference signal transmission region of a terminal wanting a downlink. Furthermore, the carrier sense region of a terminal wanting a downlink shares the region used as a directional busy tone region for a terminal wanting a downlink, and the region used as a reference signal transmission region of a terminal wanting an uplink. If a result of the carrier sense indicates an idle mode, then a reference signal is transmitted.

34 Claims, 13 Drawing Sheets

RADIO COMMUNICATION SYSTEM, RADIO COMMUNICATION CONTROL METHOD, RADIO COMMUNICATION APPARATUS, CONTROL METHOD FOR RADIO COMMUNICATION APPARATUS, AND COMPUTER READABLE MEDIUM UTILIZING A DIVIDED TRANSMISSION FRAME

BACKGROUND OF THE INVENTION

1. Field of the Invention

The present invention relates to a radio communication system, a radio communication control method, a radio communication apparatus, a control method for a radio communication apparatus, and a computer program that are used for performing radio data communication among terminals in a predetermined zone. More particularly, the invention relates to a radio communication system, a radio communication control method, a radio communication apparatus, a control method for a radio communication apparatus, and a computer program that are designed for a relatively small zone in a cellular radio or radio LAN applications.

Further particularly, the present invention relates to radio communication system, a radio communication control method, a radio communication apparatus, a control method for a radio communication apparatus, and a computer program that are intended to solve the problem in removing interference waves generated due to frequency repetition in an environment of a multi-cell formed of multiple micro-cells. The invention particularly relates to a radio communication system, a radio communication control method, a radio communication apparatus, a control method for a radio communication apparatus, and a computer program that achieve multi-cells and multiple accesses by carrying out fully autonomous distributed control.

2. Description of the Related Art

In recent years, there has been an accelerating demand for a broadband transmission also in the field of radio communication toward the coming broadband society. At the same time, there is an increasing demand for a radio communication system that permits higher efficiency of frequency use to use limited frequency resources more effectively thereby to efficiently accommodate an increasing number of subscribers.

To perform broadband radio communication, research and development efforts have been focused on a transmission method based on, for example, an orthogonal frequency division multiplexing (OFDM) modulation method. In the OFDM modulation method, which may be categorized as a multi-carrier transmission method, the frequencies of carriers are set such that the carriers are orthogonal with respect to each other in symbol sections.

However, the OFDM modulation method requires a wide frequency band, so that an adequate number of channels may not be secured in some cases. Such a case inconveniently prevents the use of a technique for removing co-channel interference attributable to frequency repetition.

For achieving improved efficiency of frequency use, a micro-cell cellular system having a smaller cellular radius is attracting the industry's attention as a promising replacement of a conventional macro-cell cellular system. The micro-cell cellular system allows the same frequency to be used more repeatedly with resultant higher efficiency of frequency use. It is, however, difficult to regularly arrange cells, and overlap of cells is likely to occur more frequently, making it difficult to regularly repeat the same frequencies.

Conventional cellular systems have been carrying out multiple accesses primarily by using the time division multiple access (TDMA)/time division duplex (TDD) method. In the TDMA communication method, the radio waves in the same frequency band in radio communication are assigned a plurality of time intervals or slots to enable a plurality of users to simultaneously use the frequency band. In the TDD communication method, an uplink and a downlink share the radio waves of the same frequency. Base stations operate in synchronization, and share standardized lengths and locations for uplinks and downlinks. This system, therefore, cannot successfully handle a case where a certain base station has more uplinks, while another base station has more downlinks.

In other words, the micro-cell cellular system fails to successfully remove the co-channel interference caused by the repetitious use of the same frequencies, or fails to permit free change of uplink/downlink ratios in some cases.

SUMMARY OF THE INVENTION

Accordingly, it is an object of the present invention to provide a radio communication system, a radio communication control method, a radio communication apparatus, a control method for a radio communication apparatus, and a computer program that permit a solution to the problem with the removal of interference waves caused by frequency repetition in a multi-cell environment including numerous micro-cells.

It is another object of the present invention to provide a radio communication system, a radio communication control method, a radio communication apparatus, a control method for a radio communication apparatus, and a computer program that permit successful removal of co-channel interference attributable to frequency repetition, and also allow an uplink/downlink ratio to be freely changed.

It is yet another object of the present invention to provide a radio communication system, a radio communication control method, a radio communication apparatus, a control method for a radio communication apparatus, and a computer program that make it possible to achieve multi-cells and multiple accesses by carrying out fully autonomous distributed control.

To these ends, a first aspect of the present invention provides a radio communication system including: a base station equipped with a sector antenna; and a mobile station equipped with an omnidirectional antenna, wherein a transmission frame is divided into slots to perform multiple access, and each of the slots includes: region 1 in which a base station transmits a directional busy tone through a sector antenna used for a mobile station in an uplink mode; region 2 in which a mobile station in a downlink mode transmits a reference signal through an omnidirectional antenna to the base station; region 3 in which the base station transmits a directional busy tone through a sector antenna used for a mobile station in the downlink mode; and region 4 in which a mobile station in an uplink mode transmits a reference signal through an omnidirectional antenna to the base station.

The term "system" in this case refers to a logical assembly of a plurality of apparatuses or functional modules for implementing particular functions, regardless of whether or not the apparatuses or modules are housed in a single cabinet.

A second aspect of the present invention provides a radio communication control method for carrying out multiple access by dividing a transmission frame into slots in a radio cell having a base station equipped with a sector antenna and a mobile station equipped with an omnidirectional antenna, the control method including: a step in which a base station transmits a directional busy tone in region 1 of a relevant slot through a sector antenna used for a mobile station in an uplink mode; a step in which a mobile station in a downlink mode transmits a reference signal in region 2 of a relevant slot through an omnidirectional antenna to the base station; a step in which the base station transmits a directional busy tone in region 3 of a relevant slot through a sector antenna used for a mobile station in the downlink mode; and a step in which a mobile station in an uplink mode transmits a reference signal in region 4 of a relevant slot through an omnidirectional antenna to the base station.

In the radio communication system according to the first aspect of the invention and the radio communication control method according to the second aspect of the invention, a base station is provided with a plurality of sector antennas, while a mobile station is provided with one omnidirectional antenna. Normally, no sophisticated antenna can be mounted on a mobile station because of limited cost. All base stations act in synchronization. Access control is based on the TDMA/TDD method, while whether each slot is assigned to uplink or downlink is decided in an autonomous distributed mode by competition among mobile stations.

The first half of each slot has a carrier sensing region, a reference signal transmission region, and a directional busy tone region for a mobile station wanting an uplink, and similarly, a carrier sensing region, a reference signal transmission region, and a directional busy tone region for a mobile station wanting a downlink.

The carrier sensing region of a terminal wanting an uplink uses the same region as region 1, which is the directional busy tone region for a terminal wanting an uplink, and region 2, which is the reference signal transmission region of a terminal wanting a downlink. Similarly, the carrier sensing region of a terminal wanting a downlink uses the same region as region 3, which is the directional busy tone region for a terminal wanting a downlink, and region 4, which is the reference signal transmission region of a terminal wanting an uplink.

Using such a format, if the result of carrier sensing indicates an idle status, then a reference signal is transmitted, so that a base station grants a requesting terminal to effect an uplink or downlink. This arrangement allows a radio communication system capable of minimizing co-channel interference in a multi-cell environment and of permitting the uplink/downlink ratio to be changed as desired.

Hence, according to the first and second aspects of the present invention, a mobile station wanting an uplink may perform carrier sense in region 1 and region 2 in a desired slot. If no carriers are sensed in these regions, then a reference signal may be transmitted using an omnidirectional antenna in region 4 of the same slot. This means that using a directional busy tone from a base station permits the entry of a mobile station that belongs to a different sector.

At this time, a base station that has received an omnidirectional reference signal in region 4 of a slot selects a sector antenna having a most desirable ratio of a desired signal to an interference signal, and transmits a directional busy tone in region 1 of the slot by using the sector antenna. This makes it possible to obtain spatial multiple effect. A mobile station in an uplink mode may continue to transmit a reference signal in region 4 of the slot by using an omnidirectional antenna.

Meanwhile, a mobile station wanting an uplink performs carrier sense in region 1 and region 2 in a desired slot, and if it senses a carrier in at least one of the two regions, then it gives up entry. More specifically, if a directional busy tone is being transmitted through a sector antenna used for another mobile station in the uplink mode, then the mobile station quits the attempt of the uplink the moment a carrier is sensed; because it is not capable of effecting space division multiplexing by using the sector antenna. Similarly, if the mobile station detects, during its carrier sense, an omnidirectional reference signal of another mobile station in the downlink mode, then the mobile station interrupts the attempt of an uplink if there is a mobile station in the downlink mode that would be affected by an uplink transmitted by the mobile station through an omnidirectional antenna.

A mobile station wanting a downlink may perform carrier sense in region 3 and region 4 in a desired slot, and transmit a reference signal through an omnidirectional antenna in region 2 of the slot in response to the result indicating no carrier sensed in the two regions. This means that using a directional busy tone from a base station as a carrier sense signal permits the entry of a mobile station belonging to another sector.

At this time, a base station that has received an omnidirectional reference signal in region 2 of the slot selects a sector antenna having a most desirable ratio of a desired signal to an interference signal, and transmits a directional busy tone in region 3 of a pertinent slot by using the sector antenna. This allows spatial multiple effect to be obtained. The mobile station, when in the downlink mode, may continue to transmit a reference signal through an omnidirectional antenna in region 2 of the pertinent slot.

Meanwhile, a mobile station wanting a downlink performs carrier sense in region 3 and region 4 in a desired slot, and if it senses carriers in at least one of the two regions, then it gives up entry. More specifically, if a directional busy tone is being transmitted through a sector antenna used for another mobile station in the downlink mode, then the mobile station quits the attempt of the downlink the moment a carrier is sensed, because the mobile station is not capable of effecting space division multiplexing by using the sector antenna. Similarly, if the mobile station detects, during its carrier sense, an omnidirectional reference signal of another mobile station in the uplink mode, then the mobile station interrupts the attempt of a downlink because the influences of a co-channel from an omnidirectional antenna of the mobile station in the uplink mode would prevent reception.

A base station transmits a broadcast slot that includes the information indicating whether each slot is currently in the uplink mode or the downlink mode, the information for notifying a mobile station having a downlink of the presence of pertinent downlink data, and the information for authorizing a mobile station wanting an uplink to carry out the uplink.

The type of antenna of a base station is a sector antenna used for both transmitting and receiving, so that the base station cannot receive any data while it is transmitting data. This means that the base station can perform space division multiplexing by using the sector antenna; however, the space division multiplexing can be effected only if both parties are in the uplink mode or the downlink mode. For this reason, a base station transmits a broadcast slot that contains the information indicating whether the base station is currently in the uplink mode or the downlink mode, and also notifying mobile stations of whether each slot is in the uplink mode or the downlink mode. This enables each mobile station to select a slot to conduct carrier sense.

The mobile stations do not know whether they have downlinks for them, so that the base station attempts to inform a mobile station having a downlink of the presence of downlink data by using a broadcast slot.

Even if a mobile station finds an idle state as a result of carrier sense, it is a base station that makes a final decision whether to accept an uplink from the mobile station according to a reference signal received from the mobile station wanting the uplink. Therefore, the base station notifies the mobile station of its decision result by using a broadcast slot.

A third aspect of the present invention provides a radio communication apparatus that has a plurality of directional sector antennas and acts as a base station in a radio cell, a transmission frame being divided into slots to perform multiple access, or a control method for the same. The radio communication apparatus or the control method therefore includes a means or a step for transmitting a directional busy tone by using region 1 of a slot through a sector antenna used for a mobile station in an uplink mode, and a means or a step for transmitting a directional busy tone by using region 3 of a slot through the sector antenna used for a mobile station in a downlink mode.

Upon receipt of an omnidirectional reference signal in region 4 of a slot, the base station in accordance with the third aspect of the invention selects a sector antenna having a most desirable ratio of a desired signal to an interference signal and transmits a directional busy tone in region 1 of a pertinent slot by using the sector antenna. Furthermore, upon receipt of an omnidirectional reference signal in region 2 of a slot, the base station in accordance with the third aspect of the invention selects a sector antenna having a most desirable ratio of a desired signal to an interference signal and transmits a directional busy tone in region 3 of a pertinent slot by using the sector antenna. With this arrangement, the spatial multiple effect can be improved.

Alternatively, the base station in accordance with the third aspect of the invention may transmit a broadcast slot that contains the information indicating whether each slot is currently in the uplink mode or the downlink mode, the information for notifying a mobile station that has a downlink waiting of the presence of pertinent downlink data, and the information for granting a mobile station wanting an uplink to carry out the uplink.

A fourth aspect of the invention provides a radio communication apparatus that has an omnidirectional antenna and acts as a mobile station in a radio cell, a transmission frame being divided into slots to perform multiple access, or a control method for the same. The radio communication apparatus or the control method for the same include a means or a step for transmitting an omnidirectional reference signal by using region 2 of a slot in a downlink mode, a means or a step for transmitting an omnidirectional reference signal by using region 4 of a slot in an uplink mode, a means or a step for performing carrier sense in region 1 and region 2 of a desired slot when requiring an uplink, and a means or a step for performing carrier sense in region 3 and region 4 of a desired slot when requiring a downlink.

The mobile station according to the fourth aspect of the invention performs an uplink if no carrier is detected in region 1 and region 2 of a desired slot for an uplink, while it does not perform the uplink if a carrier is detected. Similarly, the mobile station performs a downlink if no carrier is detected in region 3 and region 4 of a desired slot for a downlink, while it does not perform the downlink if a carrier is detected.

More specifically, a mobile station cannot effect space division multiplexing by using a sector antenna while it is transmitting a directional busy tone through a sector antenna used for another mobile station in the uplink mode. Hence, the mobile station interrupts an attempt for an uplink the moment a carrier is sensed. The mobile station does not carry out an uplink also when it detects an omnidirectional reference signal of another mobile station in the downlink mode and if its transmission of an uplink through an omnidirectional antenna would affect a mobile station in the middle of a downlink.

If a directional busy tone is being transmitted through a sector antenna used for another mobile station in the downlink mode, then the mobile station will detect a carrier and interrupt the attempt of the downlink the moment the carrier is sensed, because the mobile station is not capable of effecting space division multiplexing by using the sector antenna. Similarly, if the mobile station senses an omnidirectional reference signal of another mobile station in the uplink mode, then the mobile station interrupts the attempt of a downlink because the influences of a co-channel from an omnidirectional antenna of the mobile station in the middle of an uplink would prevent reception.

A fifth aspect of the present invention provides a computer program described to carry out, on a computer system, the control of a radio communication apparatus that has a plurality of directional sector antennas and acts as a base station in a radio cell, a transmission frame being divided into slots to perform multiple access. Each of the slots includes region 1 in which the base station transmits a directional busy tone through a sector antenna used for a mobile station in an uplink mode, region 2 in which a mobile station in a downlink mode transmits a reference signal through an omnidirectional antenna to the base station, region 3 in which the base station transmits a directional busy tone through a sector antenna used for a mobile station in the downlink mode, and region 4 in which a mobile station in an uplink mode transmits a reference signal through an omnidirectional antenna to the base station. The computer program includes a step for transmitting a directional busy tone by using region 1 of a slot through a sector antenna used for a mobile station in the uplink mode, and a step for transmitting a directional busy tone by using region 3 of a slot through a sector antenna used for a mobile station in the downlink mode.

An sixth aspect of the present invention provides a computer program described to carry out, on a computer system, the control of a radio communication apparatus that has an omnidirectional antenna and acts as a mobile station in a radio cell, a transmission frame being divided into slots to perform multiple access. Each of the slots includes region 1 in which the base station transmits a directional busy tone through a sector antenna used for a mobile station in an uplink mode, region 2 in which a mobile station in a downlink mode transmits a reference signal through an omnidirectional antenna to the base station, region 3 in which the base station transmits a directional busy tone through a sector antenna used for a mobile station in the downlink mode, and region 4 in which a mobile station in an uplink mode transmits a reference signal through an omnidirectional antenna to the base station. The computer program includes a step for transmitting an omnidirectional reference signal by using region 2 of a slot in the downlink mode, a step for transmitting an omnidirectional reference signal by using region 4 of a slot in the uplink mode, a step for performing carrier sense in region 1 and region 2 of a desired slot when requiring an uplink, and a step for performing carrier sense in region 3 and region 4 of a desired slot when requiring a downlink.

The computer programs according to the fifth and sixth aspects of the present invention define computer programs described in a computer-readable format to implement predetermined processing on a computer system. In other words, installing predetermined computer software in computer systems according to the seventh and eighth aspects of the present invention allows the cooperative operations to be performed on the computer systems, making it possible to obtain the same advantages as those obtained by the radio communication apparatuses or the control methods for the same according to the third and fourth aspects of the invention.

Further objects, characteristics, and advantages of the present invention will become apparent from an embodiment of the present invention, which will be described hereinafter, and detailed explanation based on the accompanying drawings.

DESCRIPTION OF THE PREFERRED EMBODIMENTS

With reference to the accompanying drawings, an embodiment in accordance with the present invention will be described in detail.

A radio communication system according to the present invention is primarily applied to a multi-cell environment formed of numerous micro-cells. The radio communication system is capable of ideally implementing a function for removing co-channel interference attributable to frequency repetition, and permits free adjustment of an uplink/downlink ratio.

In the radio communication system according to the present invention, a base station is provided with a plurality of sector antennas, while a mobile station is provided with one omnidirectional antenna. Normally, no sophisticated antenna can be mounted on a mobile station because of limited cost. All base stations act in synchronization. Access control is based on the TDMA/TDD method, while whether each slot is assigned to uplink or downlink is decided in an autonomous distributed mode by competition among mobile stations.

Figure 12:
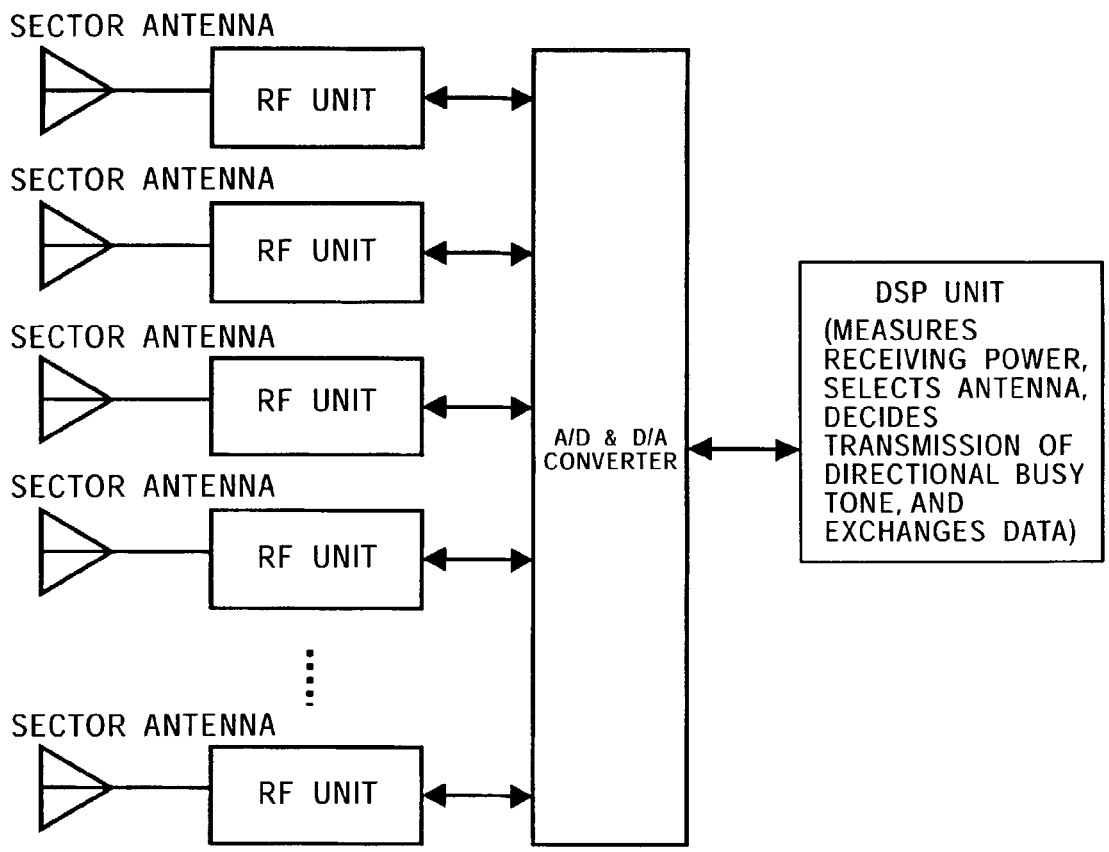
FIG. 12 schematically shows a configuration of a radio communication apparatus capable of acting as a base station in a radio communication system according to the embodiment.

FIG. 12 schematically shows the construction of a radio communication apparatus capable of acting as a base station in the radio communication system according to the embodiment. As shown in the drawing, the base station is equipped with a plurality of directional sector antennas. Each sector antenna has an RF unit for carrying out processing to transmit and receive radio data, an A/D and D/A converter for converting received data in the RF unit from analog to digital data, or for converting transmission data from digital to analog data, and a digital signal processing (DSP) unit that controls the measurement of the receiving power at the base station, the selection of antennas, the decision for transmitting a directional busy tone, and the transmission and reception of data. The DSP unit may be constructed of a computer system, such as a workstation (WS) or a personal computer (PC).

Figure 13:
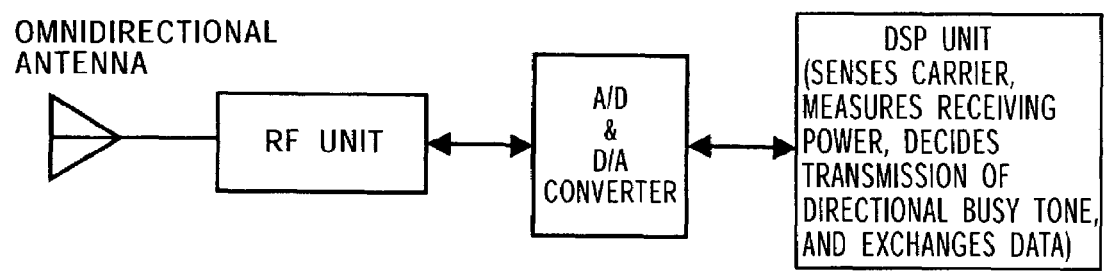
FIG. 13 schematically shows a configuration of a radio communication apparatus capable of acting as a mobile station in the radio communication system.

FIG. 13 schematically illustrates the construction of a radio communication apparatus capable of acting as a mobile station in the radio communication system according to the embodiment. As shown in the drawing, the mobile station is equipped with a single omnidirectional antenna, an RF unit for carrying out processing to transmit and receive radio data at the omnidirectional antenna, an A/D and D/A converter for converting received data in the RF unit from analog to digital data, or for converting transmission data from digital to analog data, and a DSP unit that controls carrier sense by the mobile station, the measurement of receiving power, the decision for transmitting an omnidirectional busy tone, and the transmission and reception of data. The DSP unit may be constructed of, for example, a PC or an information terminal, such as a personal digital assistant (PDA), or a cellular telephone.

Figure 1:
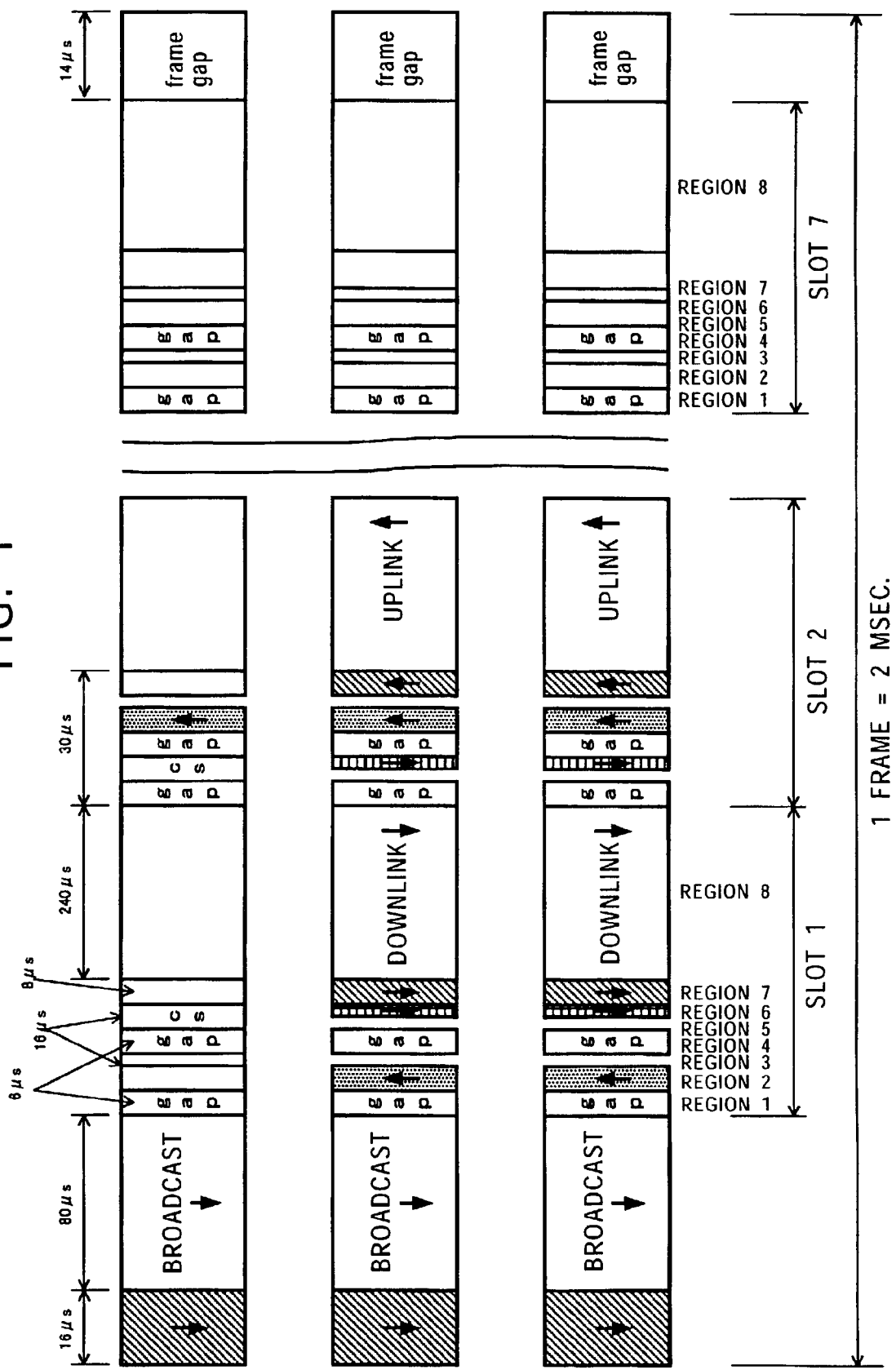
FIG. 1 shows a configuration example of a frame format used in a radio communication system according to an embodiment of the present invention.

FIG. 1 shows a configuration example of a frame format used in a radio communication system according to an embodiment of the present invention. In this example, one frame denotes 2 msec.

All base stations use a part of the region of broadcast data at the beginning of a frame to autonomously synchronize. Hence, the frame cycles and the positions of the slots of all base stations are the same.

The frames have broadcast slots, uplink slots, and downlink slots.

The broadcast slots are always the leading slots, whereas the slots for downlink and the slots for uplink are decided among the seven slots of each frame by competition. Referring now to FIG. 1, the configuration of slot 1 through slot 7 will be explained.

Each slot has GAP regions for switching between transmission and reception, and a region for transmitting omnidirectional reference signals from a mobile station to a base station. By receiving the omnidirectional reference signal, the base station decides which sector antenna is suited for the reception or transmission from or to the mobile station. Furthermore, the base station compares the power of a desired wave with the power of an interference wave to decide whether the traffic of the mobile station can be accommodated or not.

There is also a region for transmitting signal for a busy tone from a base station by using a sector antenna.

There is also a region for a reference signal that is provided at the beginning of each user data, the reference signal being for effecting frequency offset or channel estimation.

Region 1 and region 4 are GAPs required for switching between transmission reception in the radio communication apparatus. The GAPs are commonly used for uplink and downlink, while other regions are assigned differently between downlink and uplink.

Region 2 and region 3 are used for performing carrier sense for uplink. Region 3 has a directional busy tone created by a sector antenna of a base station used mainly for another mobile station in the middle of an uplink. Region 2 has a reference signal transmitted by another downlink to a base station through an omnidirectional antenna.

Region 5 and region 6 are the regions where carrier sense for downlink is carried out. Region 6 has a busy tone created by a sector antenna of a base station used mainly for another mobile station in the middle of a downlink. Region 5 has a reference signal transmitted by another uplink to a base station through an omnidirectional antenna.

The descriptions will now be given of the uplink operation performed by a mobile station in the radio communication system in accordance with the embodiment.

Figure 2:
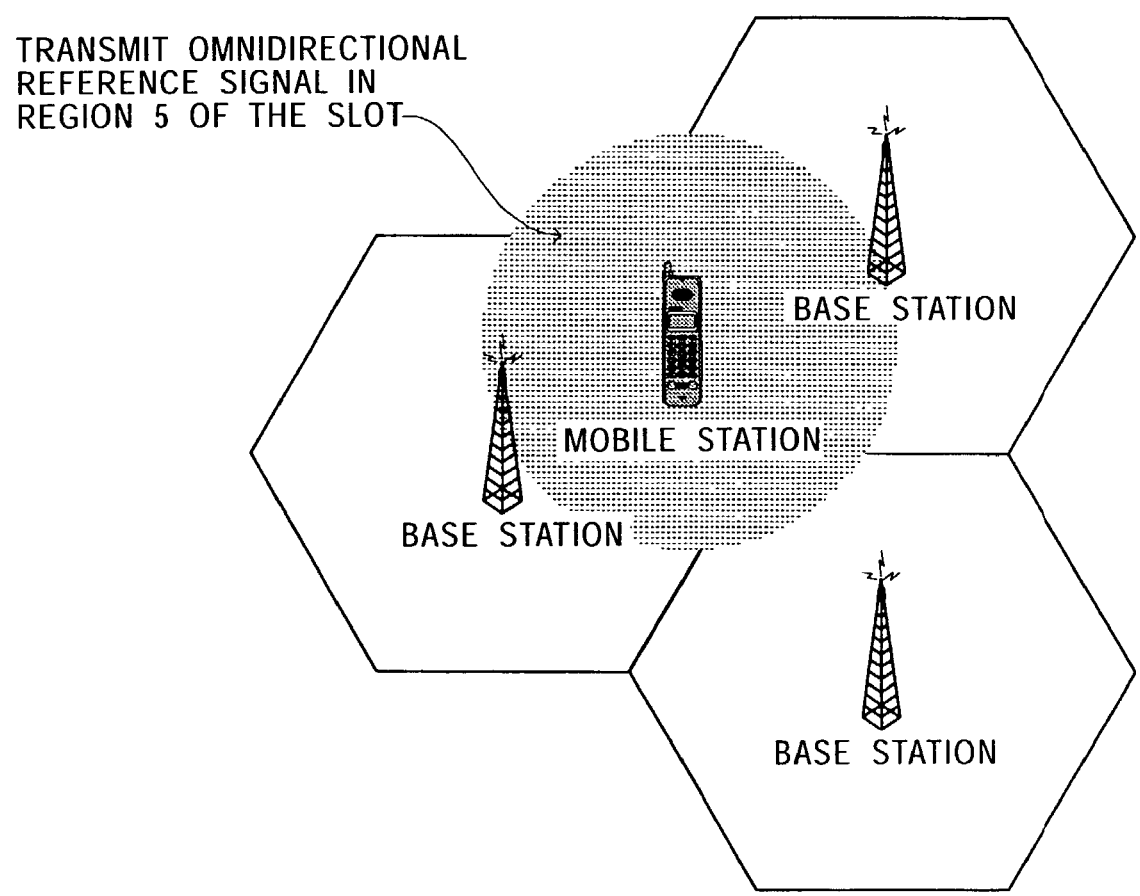
FIG. 2 shows a mobile station desiring an uplink that transmits a reference signal through an omnidirectional antenna in region 5 if no carrier is sensed in region 2 and region 3 of a desired slot.

The mobile station desiring an uplink performs carrier sense in region 2 and region 3 of a desired slot. If the mobile station does not sense any carriers in these regions (idle state), then it transmits a reference signal in region 5 by using an omnidirectional antenna (refer to FIG. 2).

Figure 3:
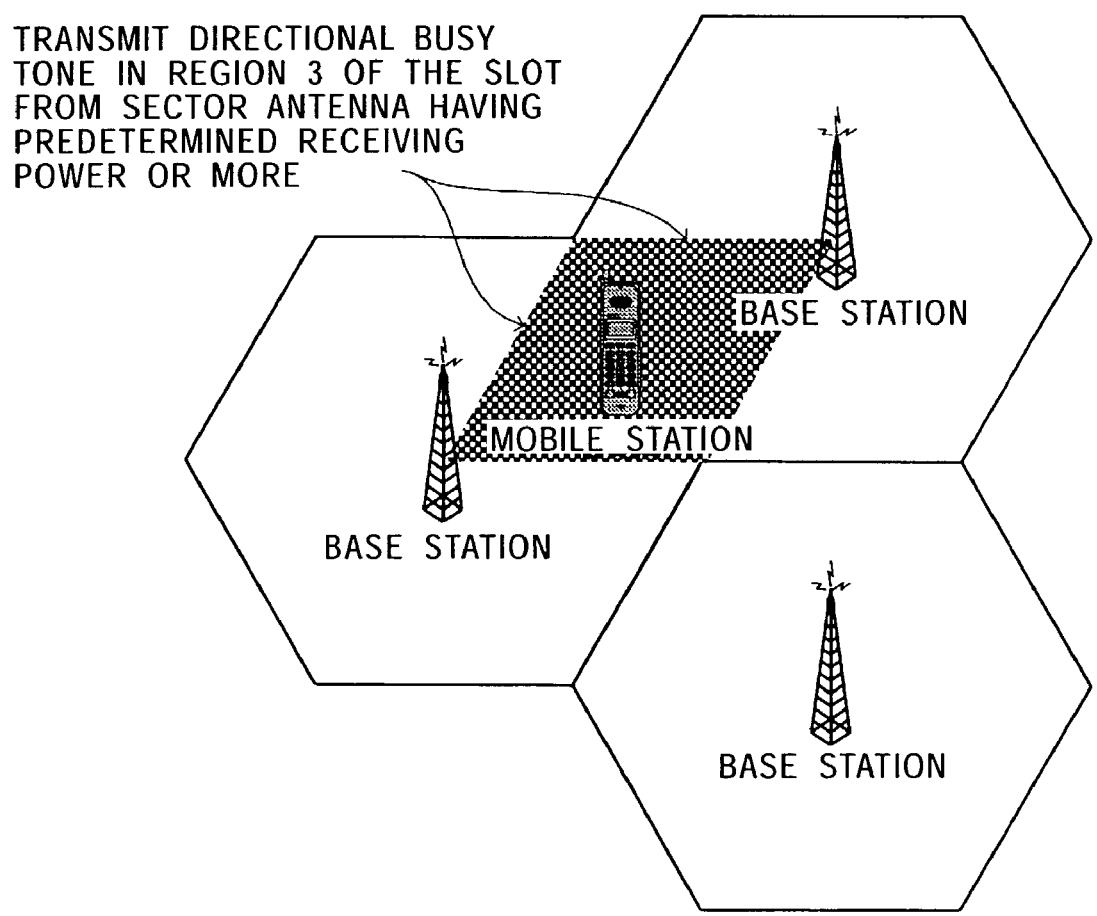
FIG. 3 shows a base station accommodating an uplink transmits a directional busy tone in region 3 of a pertinent slot by using a sector antenna whose receiving power exceeds a certain level in region 5.

The base station that has received the reference signal selects a sector antenna presenting a most desirable co-channel interference ratio (CCI ratio: the ratio of a desired signal to an interference signal). If the CCI ratio exceeds a predetermined threshold value, then the base station decides that the uplink of the mobile station can be accommodated, and issues permission to the mobile station for the uplink in terms of the broadcast slot of the next frame. Subsequently, the base station transmits a directional busy tone in region 3 of a pertinent slot by using a sector antenna exhibiting a predetermined level or more of receiving power including that of both the desired wave and the interference wave in region 5 (refer to FIG. 3).

Thus, another mobile station belonging to the sector antenna senses the above directional busy tone when it performs carrier sense prior to an uplink, so that it cannot carry out the uplink. The mobile station then continues to transmit the reference signal of region 5, a preamble of region 7, and uplink data of region 8. This is continued until the data to be transmitted runs out or the permission in the broadcast slot from the base station is canceled.

The descriptions will now be given of the downlink operation performed by a mobile station in the radio communication system according to the embodiment.

The mobile stations do not know whether they have downlinks addressed to them. For this reason, if a base station finds a downlink directed to a mobile station belonging thereto, then the base station uses a broadcast slot to notify the mobile station of the presence of the downlink, which will be discussed hereinafter.

Figure 4:
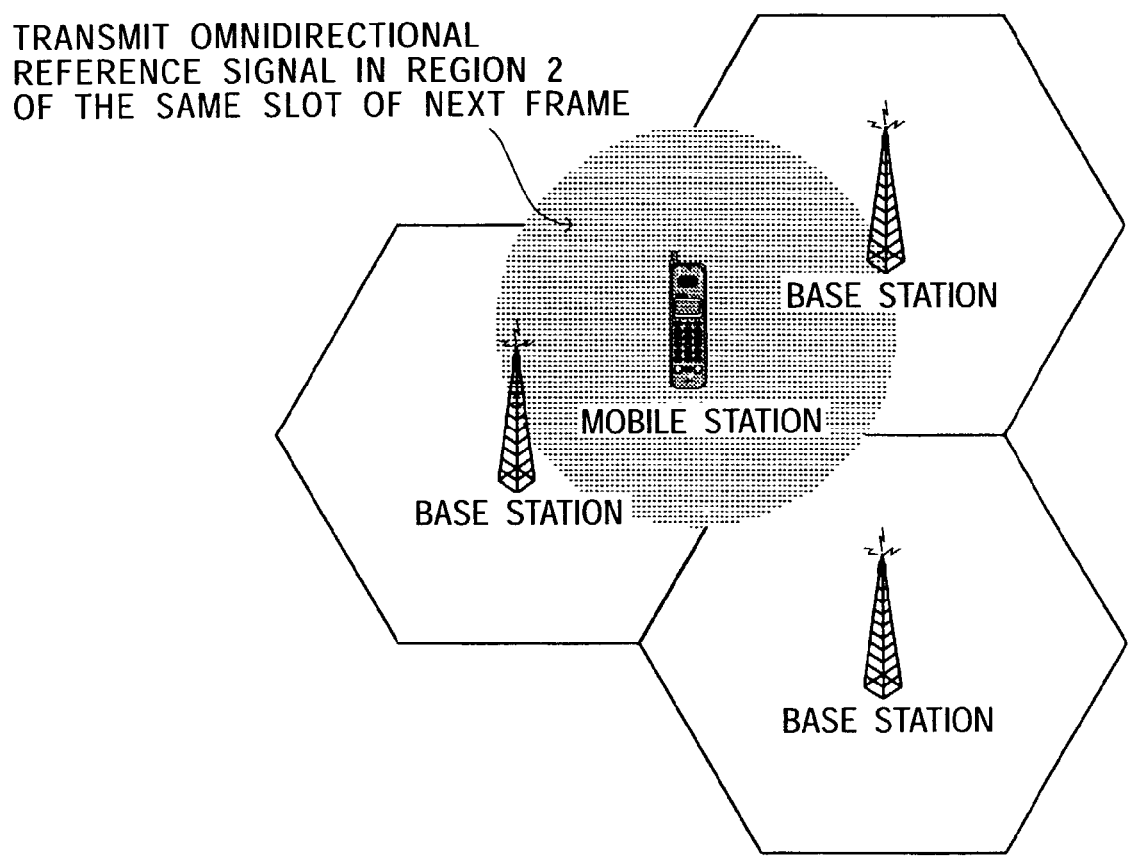
FIG. 4 shows a case where if no carriers are sensed in region 5 and region 6 of a slot desired by a mobile station desiring a downlink, then the mobile station transmits a reference signal through an omnidirectional antenna in region 2 of the same slot of the following frame.

When the mobile station detects the notification through the broadcast slot, it performs carrier sense in region 5 and region 6 of a desired slot. If the mobile station does not sense any carriers, which means an idle state, then the mobile station transmits a reference signal through an omnidirectional antenna in region 2 of the same slot of the following frame (refer to FIG. 4).

Figure 5:
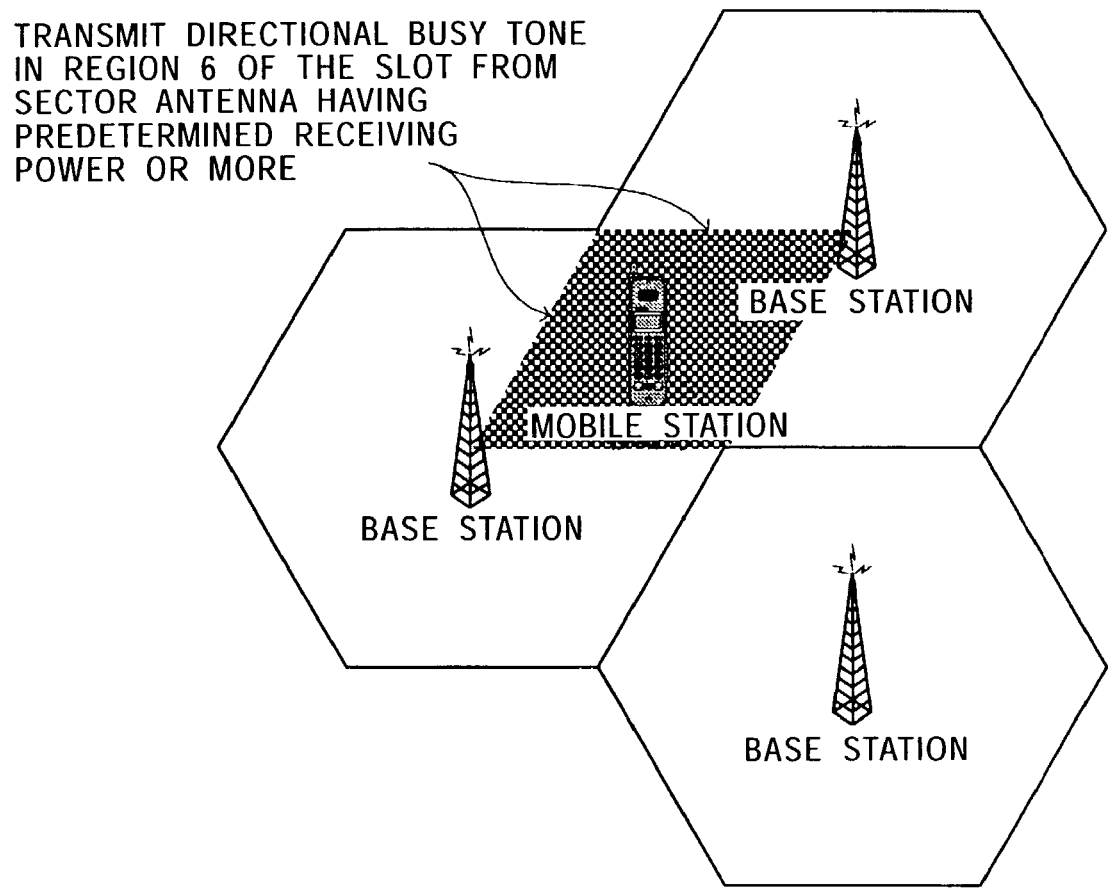
FIG. 5 shows a base station accommodating a downlink of a mobile station transmits a directional busy tone in region 6 of a pertinent slot by using a sector antenna whose receiving power exceeds a certain level in region 2.

Upon receipt of the reference signal, the base station selects a sector antenna having a most desirable CCI ratio (the ratio of a desired signal to an interference signal). If the CCI ratio exceeds a predetermined threshold value, then the base station decides that it can accommodate the downlink of the mobile station, and transmits a directional busy tone in region 6 of the same slot by using a sector antenna exhibiting a predetermined level or more of receiving power including that of both the desired wave and the interference wave in region 2 (refer to FIG. 5).

Then, the base station transmits a preamble in region 7 and downlink data of region 8, and the mobile station receive them. This is continued until the data to be transmitted from the base station runs out or until the base station decides that the CCI value no longer reaches a specified value and interrupts the downlink.

The descriptions will now be given of the broadcasting operation of a mobile station in the radio communication system according to the embodiment.

The information of a broadcast slot of a base station must reach a mobile station that belongs to the base station even if base stations are located closely to each other. For this reason, some spread codes are used in the area to enable mobile stations to receive the information of the broadcast slots even in a multi-cell environment with co-channel interferences. This is based on a concept in which, for example, a broadcast slot is subdivided into smaller slots, and desired data is accommodated in several smaller slots at random so that some of the slots may be accessed.

The information transmitted by means of a broadcast slot may be roughly divided into the three types described below.

The first type of information indicates whether each slot is currently in the middle of an uplink or downlink. The base stations in this embodiment use sector antennas used for both transmission and reception, so that they cannot receive data while they are transmitting data. Hence, the base stations can perform space division multiplexing by using the sector antennas; however, the space division multiplexing can be effected only if both parties are in the uplink mode or the downlink mode. For this reason, the base stations notify mobile stations of which slots are in the uplink or downlink mode so as to enable the mobile stations to select proper slots in which to perform carrier sense.

The second type of information notifies a mobile station having a downlink directed thereto of the presence of the downlink data. This information is necessary because the mobile stations do not know if they have downlinks directed to themselves.

The third type of information grants a mobile station wanting an uplink to carry out the uplink. Even if a mobile station finds an idle state as a result of carrier sense, it is a base station that makes a final decision whether to accept an uplink from the mobile station according to a reference signal received from the mobile station wanting the uplink. Therefore, the base station notifies the mobile station of a decision result of the base station.

Referring now to FIG. 6 through FIG. 11, the behaviors of the radio communication system according to the embodiment will be explained.

Figure 6:
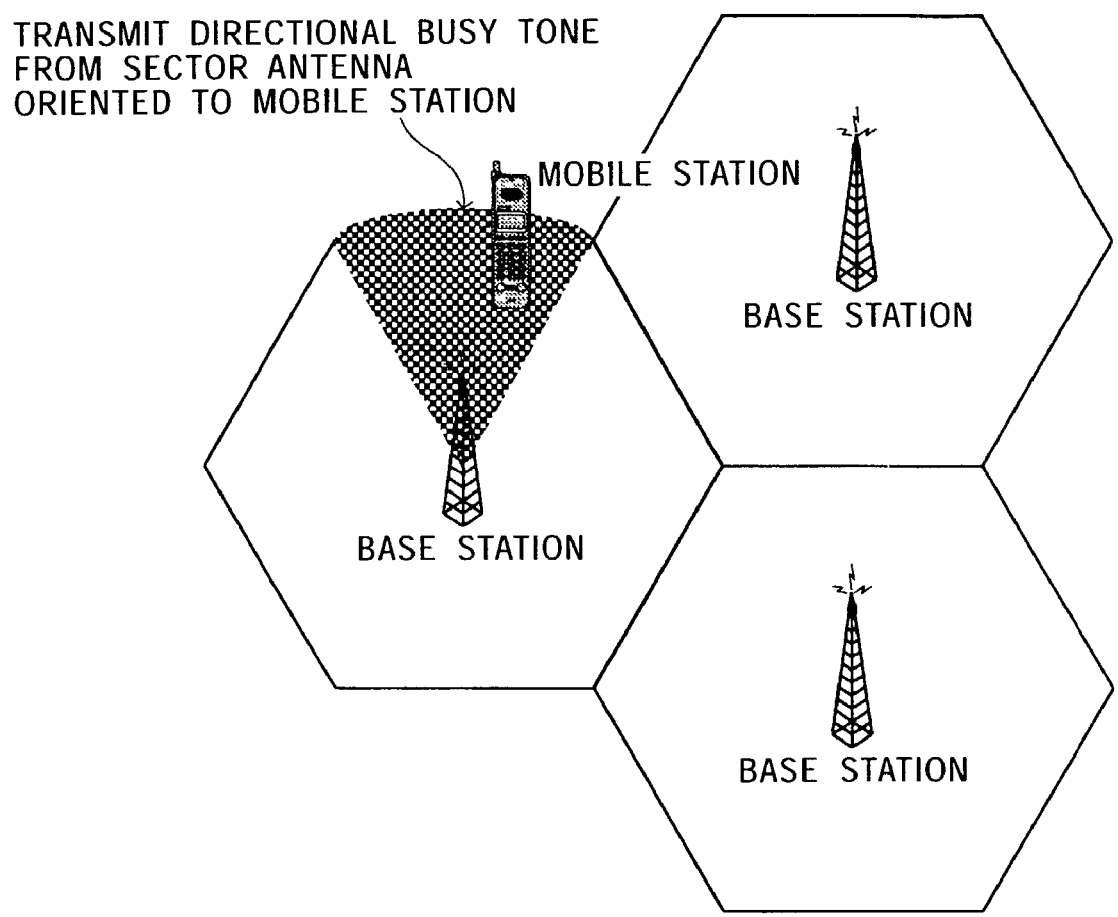
FIG. 6 shows a radio communication system according to the embodiment in which a busy tone is being transmitted through a sector antenna oriented to a mobile station in an uplink mode.

FIG. 6 illustrates a case where a mobile station is in the uplink mode, while a sector antenna oriented toward the mobile station is transmitting a busy tone by using region 3 of a slot in the radio communication system according to the embodiment.

Conventionally, it has been impossible to obtain the spatial multiple effect because the radio waves transmitted from an omnidirectional antenna of a mobile station in the uplink mode have been detected by carrier sense. In contrast to this, the radio communication system according to the embodiment uses the directional busy tone from a base station as a carrier sense signal, as shown in FIG. 6, thus allowing a mobile station belonging to another sector to enter. This is possible because the base stations use sector antennas capable of effecting the space division multiplexing.

Figure 7:
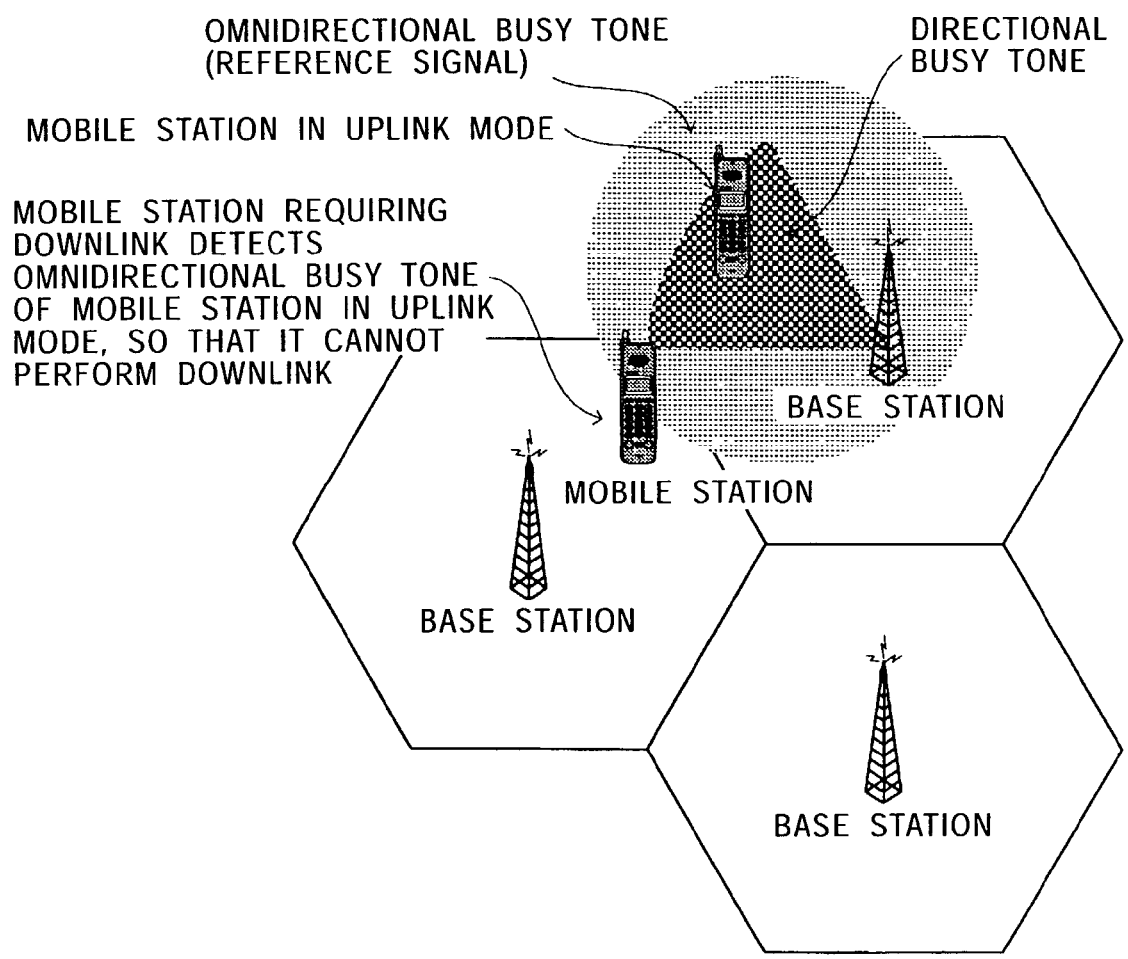
FIG. 7 shows that a mobile station in the uplink mode exists in a radio communication system in accordance with the embodiment.

FIG. 7 illustrates a case where a mobile station in the middle of an uplink exists in the radio communication system according to the embodiment. The mobile station is transmitting an omnidirectional busy tone signal (reference signal) in region 5. The base station that has received the omnidirectional busy tone signal is transmitting a directional busy tone in region 3 through an optimal sector antenna.

Under the condition shown in FIG. 7, if another mobile station desires a downlink, then the mobile station performs carrier sense in region 5 and region 6. The mobile station, however, will detect the omnidirectional busy tone in region 5, so that it cannot perform the downlink. This is because the sector antennas of the base stations are used for both transmission and reception, so that they cannot transmit any signals while they are receiving signals.

Figure 8:
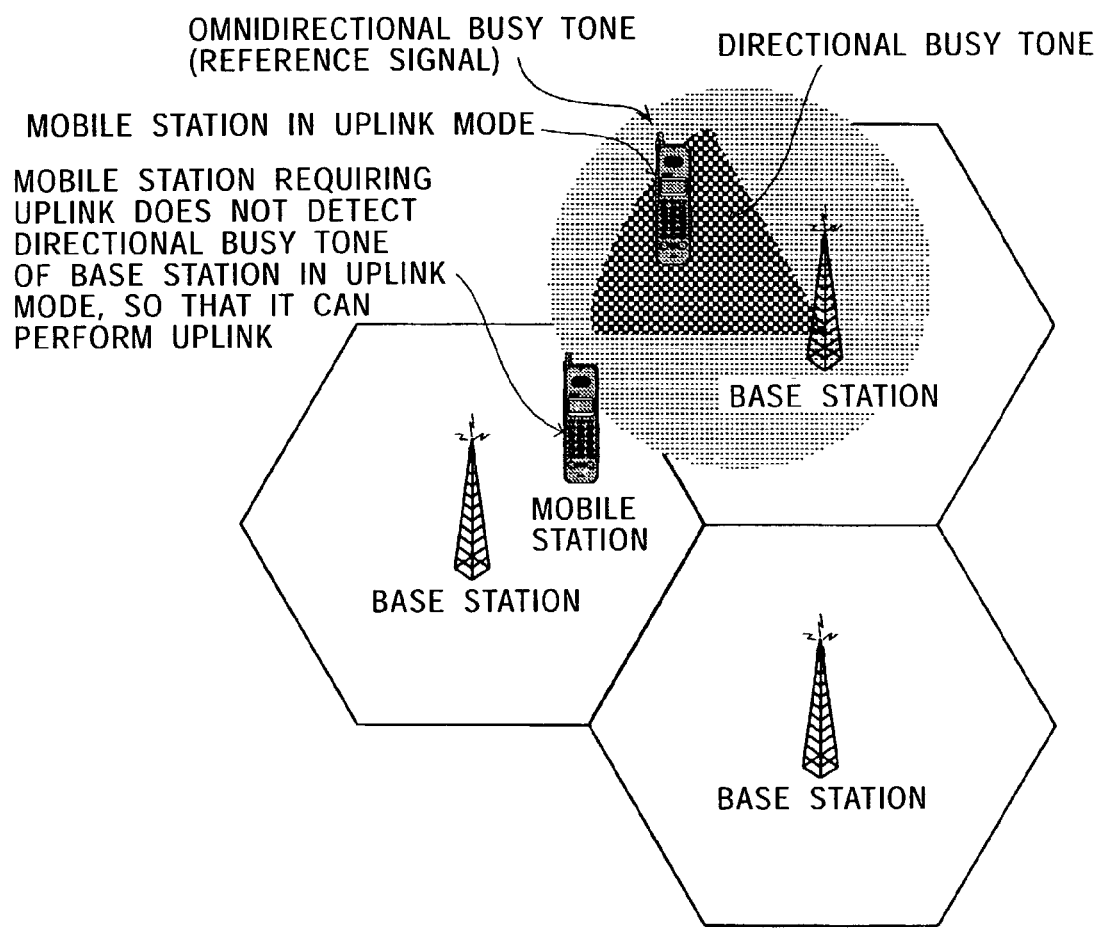
FIG. 8 shows a new mobile station wanting an uplink when a mobile station in the uplink mode already exists in the radio communication system in accordance with the embodiment.

FIG. 8 shows a case where a mobile station is in the middle of an uplink, while another mobile station is making an attempt for an uplink. As illustrated, the latter mobile station will not sense the directional busy tone signal in region 3, so that it can effect the uplink. This is because the sector antennas of the base stations are capable of space division multiplexing.

Figure 9:
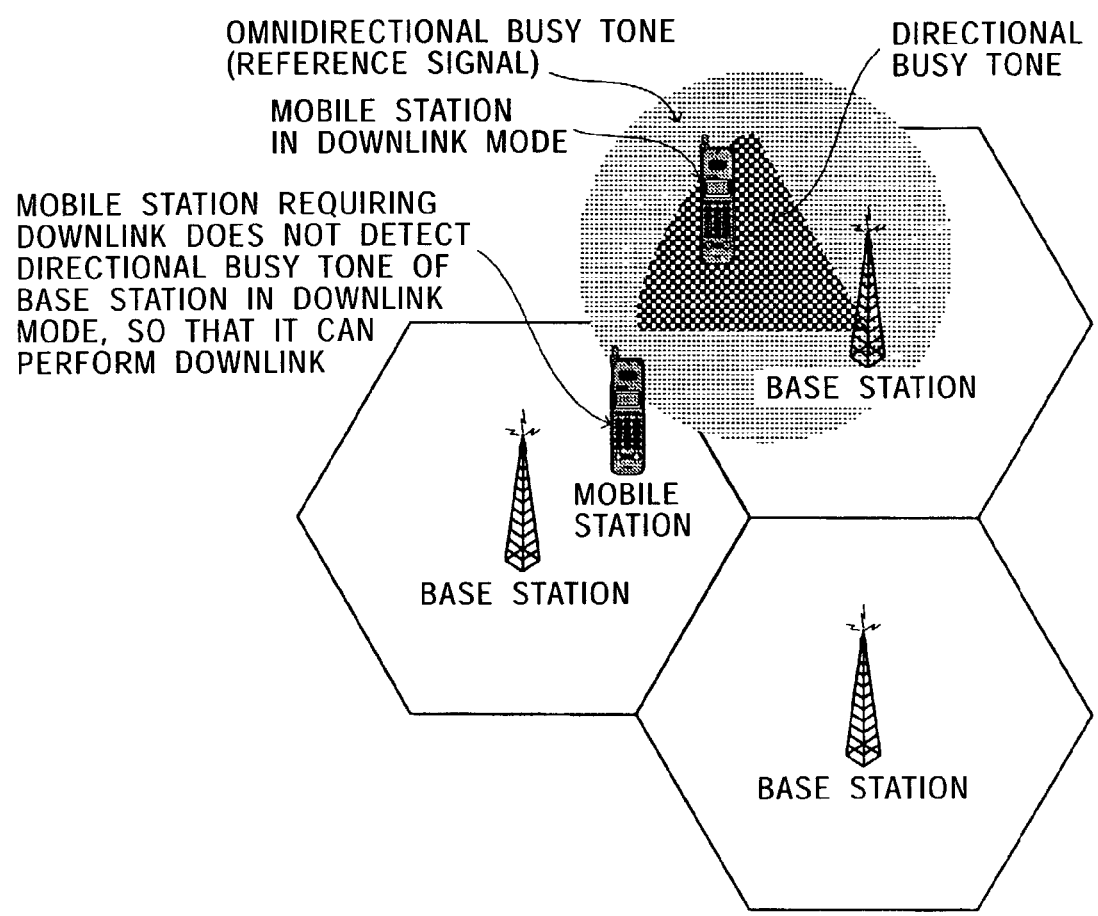
FIG. 9 shows a radio communication system according to the embodiment in which a busy tone is being transmitted through a sector antenna oriented to a mobile station in a downlink mode.

FIG. 9 shows a case where a mobile station is in the middle of a downlink, while a sector antenna oriented toward the mobile station is transmitting a busy tone signal in the radio communication system according to the embodiment.

Conventionally, it has been impossible to obtain the spatial multiple effect because the radio waves transmitted from an omnidirectional antenna of a mobile station in the downlink mode has been detected by carrier sense. In contrast to this, the radio communication system according to the embodiment uses the directional busy tone from the base station as a carrier sense signal, as shown in FIG. 9, thus allowing a mobile station belonging to another sector to enter. This is possible because the base stations use sector antennas capable of effecting the space division multiplexing.

Figure 10:
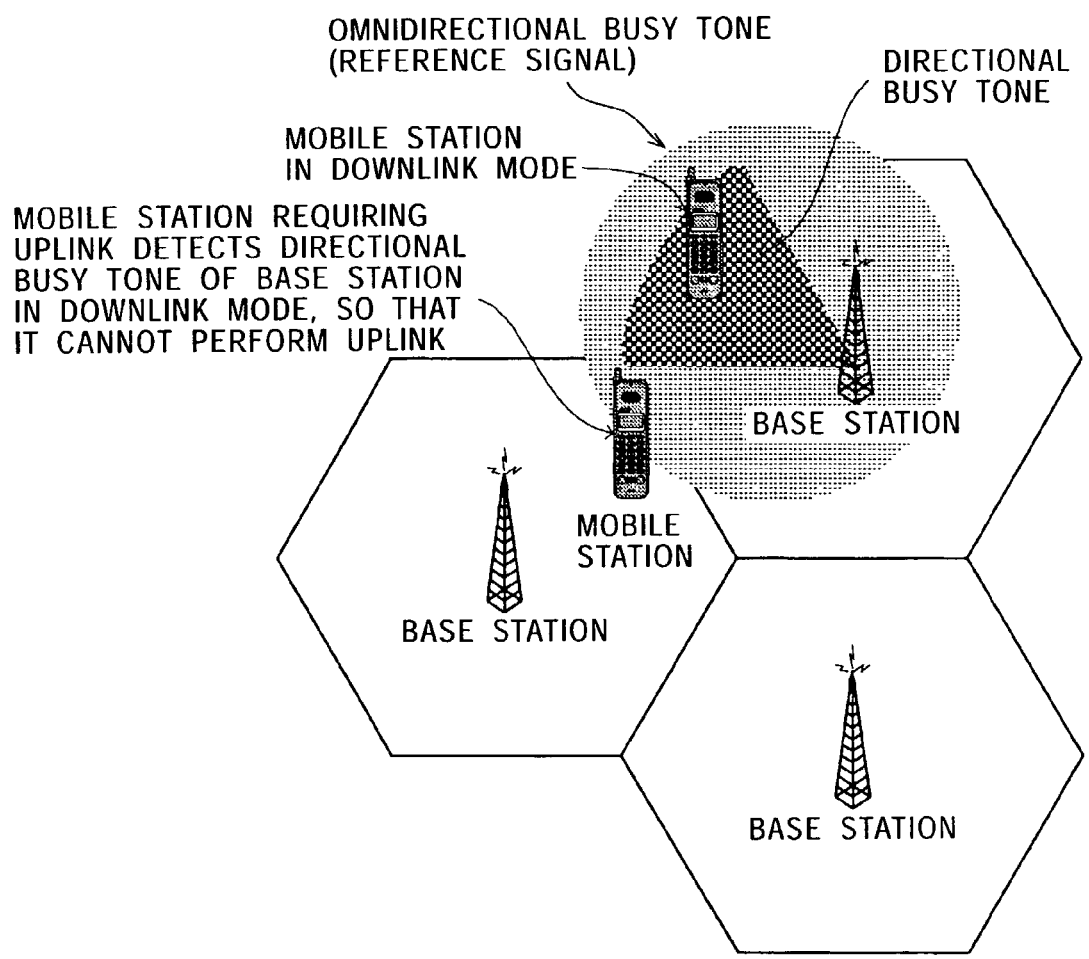
FIG. 10 shows that a mobile station in the downlink mode exists in a radio communication system in accordance with the embodiment.

FIG. 10 shows a case where a mobile station in the middle of a downlink exists in the radio communication system according to the embodiment. The mobile station is transmitting an omnidirectional busy tone (reference signal) in region 2. A base station that has received the omnidirectional busy tone signal is transmitting a directional busy tone in region 6 by using an optimum sector antenna.

Under the condition shown in FIG. 10, when another mobile station makes an attempt for an uplink, the mobile station performs carrier sense in region 2 and region 3. The mobile station, however, will detect the omnidirectional busy tone in region 2, so that it cannot perform the downlink. This is because the sector antennas of the base stations are used for both transmission and reception, so that they cannot receive any signals while they are transmitting signals.

Figure 11:
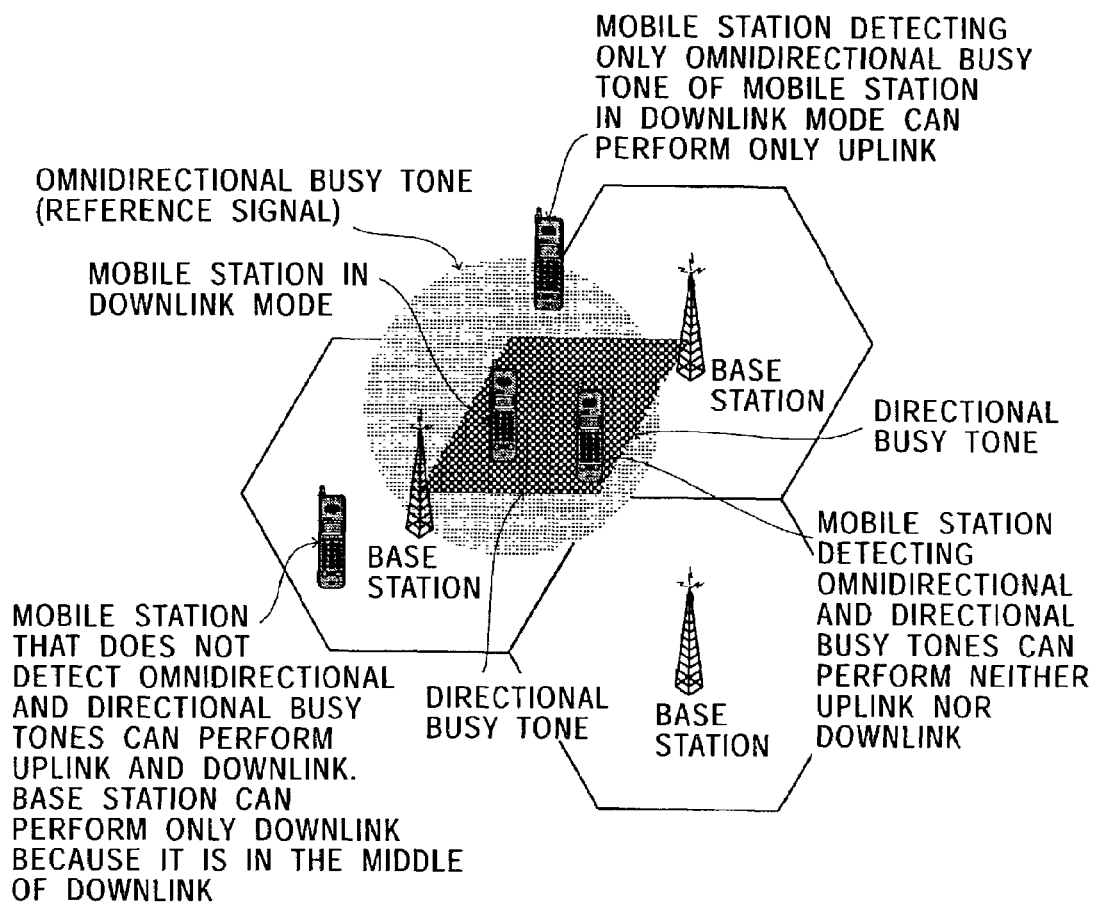
FIG. 11 shows a case where, when a mobile station in the downlink mode exists, there is a new mobile station desiring an uplink or a downlink in the same radio cell or an adjoining radio cell.

FIG. 11 shows a case where a mobile station is in the middle of a downlink, while another mobile station is making an attempt for an uplink or a downlink in the same radio cell or an adjacent radio cell.

A mobile station that is adjacent to a mobile station in the middle of a downlink, and detects only an omnidirectional busy tone in region 2 during carrier sense can effect only an uplink.

A mobile station that detects a directional busy tone in region 6 and an omnidirectional busy tone in region 2 during carrier sense can carry out neither an uplink nor a downlink.

A mobile station that detects neither a direction busy tone nor an omnidirectional busy tone can effect both an uplink and a downlink. If, however, the base station to which the mobile station belongs is already in the middle of a downlink, then the mobile station can effect only the downlink. This is because the sector antennas of the base stations are used for both transmission and reception, so that they cannot receive any signals while they are transmitting signals.

As described above, in the radio communication system according to the embodiment, a mobile station performs carrier sense in predetermined regions in a slot to autonomously learn its environment despite the random positioning of uplink and downlink slots at base stations. Thus, only mobile stations that do not affect the communication of other mobile stations can effect uplinks or downlinks.

For example, a mobile station wanting an uplink performs carrier sense. In the region of the carrier sense, a directional busy tone is being transmitted through a sector antenna used for a mobile station in the middle of an uplink, which may or may not belong to the same base station to which the mobile station wanting the uplink belongs. Therefore, the mobile station, which cannot effect space division multiplexing by using a sector antenna detects a carrier when it performs carrier sense.

Furthermore, an omnidirectional reference signal of a mobile station in the downlink mode (the mobile station may or may not belong to the same base station to which the mobile station wanting the uplink belongs) may also exist in the carrier sense region (mini-slot). Advantageously, therefore, the mobile station detects a carrier and gives up an uplink if there is a mobile station in the downlink mode that would be affected if the foregoing mobile station carries out an uplink by using the omnidirectional antenna.

A mobile station wanting a downlink also performs carrier sense. In the region of the carrier sense, a directional busy tone is being transmitted through a sector antenna used for a mobile station in the middle of a downlink, which may or may not belong to the same base station to which the mobile station wanting the downlink belongs. Therefore, the mobile station, which cannot effect space division multiplexing by using a sector antenna detects a carrier when it performs carrier sense and gives up the downlink.

Furthermore, an omnidirectional reference signal of a mobile station in the uplink mode (the mobile station may or may not belong to the same base station to which the mobile station wanting the uplink belongs) may also exist in the carrier sense region (mini-slot). Therefore, the mobile station that would be affected by the co-channel from the omnidirectional antenna of the mobile station in the uplink mode finds beforehand, by performing carrier sense, that it would not be able to receive data even if it would try, and hence cancels the attempt for receiving data.

In short, the radio communication system according to the embodiment keeps track of uplinks, downlinks, and the conditions of all mobile stations and base stations in an autonomous distributed fashion by carrier sense. Thus, maximized space division multiplexing is carried out by using the sector antennas of base stations, thereby permitting improved utilization of frequencies to be achieved.

Although the invention has been described in detail with reference to a specific embodiment, this description is not meant to be construed in a limiting sense. Various modifications or substitutions of the disclosed embodiment will become apparent to persons skilled in the art within the scope of the spirit of the invention. It is therefore contemplated that the appended claims will cover any modifications or embodiments as fall within the true scope of the invention.

What is claimed is:

1. A radio communication system comprising:
    a base station equipped with a sector antenna, the base station configured to transmit to a mobile station in accordance with a transmission frame; and
    the mobile station equipped with an omnidirectional antenna, the mobile station configured to transmit to the base station in accordance with the transmission frame,
    wherein the transmission frame is divided into slots to perform multiple access, and each of the slots comprises:
    region 1 in which the base station transmits a directional busy tone through the sector antenna used for the mobile station in an uplink mode, and the mobile station does not transmit;
    region 2 in which the mobile station in a downlink mode transmits a reference signal through the omnidirectional antenna to the base station, and the base station does not transmit;
    region 3 in which the base station transmits a directional busy tone through the sector antenna used for the mobile station in the downlink mode, and the mobile station does not transmit; and
    region 4 in which the mobile station in the uplink mode transmits the reference signal through the omnidirectional antenna to the base station, and the base station does not transmit.

2. The radio communication system according to claim 1, wherein the mobile station wanting an uplink performs carrier sense in region 1 and region 2 of a desired slot, and transmits the reference signal through the omnidirectional antenna in region 4 of the slot in response to a result indicating no carriers sensed in any of the regions.

3. The radio communication system according to claim 1, wherein the mobile station continues to transmit the reference signal through the omnidirectional antenna in region 4 of the slot during an uplink.

4. The radio communication system according to claim 1, wherein the mobile station wanting an uplink performs carrier sense in region 1 and region 2 of a desired slot, and gives up the uplink if a carrier is sensed at least in one of the two regions.

5. The radio communication system according to claim 1, wherein the base station that has received an omnidirectional reference signal in region 4 of the slot selects the sector antenna having a most desirable ratio of a desired signal to an interference signal, and transmits a directional busy tone in region 1 of a relevant slot by using the sector antenna.

6. The radio communication system according to claim 1, wherein the mobile station wanting a downlink performs carrier sense in region 3 and region 4 of a desired slot, and transmits the reference signal through the omnidirectional antenna in region 2 of the same slot in response to a result indicating no carriers sensed in any of the regions.

7. The radio communication system according to claim 1, wherein the mobile station continues to transmit the reference signal through the omnidirectional antenna in region 2 of a relevant slot during a downlink.

8. The radio communication system according to claim 1, wherein the mobile station wanting a downlink performs carrier sense in region 3 and region 4 of a desired slot, and gives up the downlink if a carrier is sensed at least in one of the two regions.

9. The radio communication system according to claim 1, wherein the base station that has received an omnidirectional reference signal in region 2 of a slot selects the sector antenna having a most desirable ratio of a desired signal to an interference signal, and transmits a directional busy tone in region 3 of a relevant slot by using the sector antenna.

10. The radio communication system according to claim 1, wherein the base station transmits a broadcast slot that includes information regarding whether each slot is currently in the uplink mode or the downlink mode, information for notifying the mobile station that has a downlink waiting of the presence of downlink data, and information for granting the mobile station wanting an uplink to perform the uplink.

11. A radio communication control method for carrying out multiple access by dividing a transmission frame into slots in a radio cell having a base station equipped with a sector antenna and a mobile station equipped with an omnidirectional antenna, comprising:
    transmitting by the base station a directional busy tone in region 1 of a relevant slot through the sector antenna used for the mobile station in an uplink mode and the mobile station is not transmitting;
    transmitting by the mobile station in a downlink mode a reference signal in region 2 of a relevant slot through the omnidirectional antenna to the base station and the base station is not transmitting;
    transmitting by the base station a directional busy tone in region 3 of a relevant slot through the sector antenna used for the mobile station in the downlink mode and the mobile station is not transmitting; and
    transmitting by the mobile station in an uplink mode the reference signal in region 4 of a relevant slot through the omnidirectional antenna to the base station and the base station is not transmitting.

12. The radio communication control method according to claim 11, wherein the mobile station wanting the uplink performs carrier sense in region 1 and region 2 of a desired slot, and transmits the reference signal through the omnidirectional antenna in region 4 of the slot in response to a result indicating no carriers sensed in any of the regions.

13. The radio communication control method according to claim 11, wherein the mobile station in the uplink mode continues to transmit the reference signal through the omnidirectional antenna in region 4 of the relevant slot.

14. The radio communication control method according to claim 11, wherein the mobile station wanting an uplink performs carrier sense in region 1 and region 2 of a desired slot, and avoids entry if a carrier is sensed at least in one of the two regions.

15. The radio communication control method according to claim 11, wherein the base station that has received an omnidirectional reference signal in region 4 of the slot selects the sector antenna having a most desirable ratio of a desired signal to an interference signal, and transmits a directional busy tone in region 1 of a relevant slot by using the sector antenna.

16. The radio communication control method according to claim 11, wherein the mobile station wanting the downlink performs carrier sense in region 3 and region 4 of a desired slot, and transmits the reference signal in region 2 of the same slot through the omnidirectional antenna in response to a result indicating no carriers sensed in any of the regions.

17. The radio communication control method according to claim 11, further comprising:
continuing to transmits by the mobile station in the downlink mode the reference signal through the omnidirectional antenna in region 2 of a relevant slot.

18. The radio communication control method according to claim 11, further comprising:
performing carrier sense by the mobile station wanting the downlink in region 3 and region 4 of a desired slot, and giving up the downlink if a carrier is sensed at least in one of the two regions.

19. The radio communication control method according to claim 11, wherein the base station that has received an omnidirectional reference signal in region 2 of a slot selects the sector antenna having a most desirable ratio of a desired signal to an interference signal, and transmits a directional busy tone in region 3 of a relevant slot by using the sector antenna.

20. The radio communication control method according to claim 11, further comprising:
transmitting by the base station a broadcast slot that includes information regarding whether each slot is currently in the uplink mode or the downlink mode, information for notifying the mobile station that has a downlink waiting of the presence of downlink data, and information for granting the mobile station wanting an uplink to perform the uplink.

21. A radio communication apparatus comprising:
a plurality of directional sector antennas;
means for transmitting a directional busy tone by using region 1 of a slot through a sector antenna used for a mobile station in an uplink mode; and
means for transmitting a directional busy tone by using region 3 of a slot through the sector antenna used for the mobile station in a downlink mode,
wherein the radio communication apparatus acts as a base station in a radio cell, the radio communication apparatus transmitting within a transmission frame divided into slots to perform multiple access, and each of the slots comprises:
region 1 in which the base station transmits a directional busy tone through the sector antenna used for the mobile station in an uplink mode, and the mobile station does not transmit;
region 2 in which the mobile station in a downlink mode transmits a reference signal through an omnidirectional antenna to the base station, and the base station does not transmit;
region 3 in which the base station transmits a directional busy tone through the sector antenna used for the mobile station in the downlink mode, and the mobile station does not transmit; and
region 4 in which the mobile station in an uplink mode transmits the reference signal through the omnidirectional antenna to the base station, and the base station does not transmit.

22. The radio communication apparatus according to claim 21, further comprising:
means for selecting the sector antenna that has a most desirable ratio of a desired signal to an interference signal and for transmitting a directional busy tone in region 1 of a relevant slot by using the sector antenna when an omnidirectional reference signal is received in region 4 of the slot.

23. The radio communication apparatus according to claim 21, further comprising:
means for selecting the sector antenna that has a most desirable ratio of a desired signal to an interference signal and for transmitting a directional busy tone in region 3 of a relevant slot by using the sector antenna when an omnidirectional reference signal is received in region 2 of the slot.

24. The radio communication apparatus according to claim 21, further comprising:
means for transmitting a broadcast slot that includes information regarding whether each slot is currently in the uplink mode or the downlink mode, information for notifying the mobile station that has a downlink waiting of the presence of downlink data, and information for granting the mobile station wanting an uplink to perform the uplink.

25. A control method for a radio communication apparatus that has a plurality of directional sector antennas and acts as a base station in a radio cell, the radio indication apparatus configured to transmit within a transmission frame divided into slots to perform multiple access, each of the slots comprising:
region 1 in which the base station transmits a directional busy tone through a sector antenna used for a mobile station in an uplink mode, and the mobile station does not transmit;
region 2 in which the mobile station in a downlink mode transmits a reference signal through an omnidirectional antenna to the base station, and the base station does not transmit;
region 3 in which the base station transmits a directional busy tone through the sector antenna used for the mobile station in the downlink mode, and the mobile station does not transmit; and
region 4 in which the mobile station in an uplink mode transmits the reference signal through the omnidirectional antenna to the base station, and the base station does not transmit,
the control method comprising:
transmitting the directional busy tone by using region 1 of a slot through the sector antenna used for the mobile station in the uplink mode and the mobile station does not transmit; and
transmitting the directional busy tone by using region 3 of a slot through the sector antenna used for the mobile station in the downlink mode and the mobile station does not transmit.

26. The control method for a radio communication apparatus according to claim 25, further comprising:
selecting the sector antenna that has a most desirable ratio of a desired signal to an interference signal and transmitting a directional busy tone in region 1 of a relevant slot by using the sector antenna when an omnidirectional reference signal is received in region 4 of the slot.

27. The control method for a radio communication apparatus according to claim 25, further comprising:
selecting the sector antenna that has a most desirable ratio of a desired signal to an interference signal and transmitting a directional busy tone in region 3 of a relevant slot by using the sector antenna when an omnidirectional reference signal is received in region 2 of the slot.

28. The control method for a radio communication apparatus according to claim 25, further comprising:
transmitting a broadcast slot that includes information regarding whether each slot is currently in the uplink mode or the downlink mode, information for notifying the mobile station that has a downlink waiting of the presence of downlink data, and information for granting the mobile station wanting an uplink to perform the uplink.

29. A radio communication apparatus comprising:

an omnidirectional antenna;

means for transmitting an omnidirectional reference signal by using region 2 of a slot in the downlink mode;

means for transmitting an omnidirectional reference signal by using region 4 of a slot in the uplink mode;

means for sensing carriers in region 1 and region 2 of a desired slot when an uplink is required; and means for sensing carriers in region 3 and region 4 of a desired slot when a downlink is required, wherein the radio communication apparatus acts as a mobile station in a radio cell, the mobile station transmits within a transmission frame is divided into slots to perform multiple access, and each of the slots comprises:

region 1 in which a base station transmits a directional busy tone through a sector antenna used for the mobile station in an uplink mode, and the mobile station does not transmit;

region 2 in which the mobile station in a downlink mode transmits a reference signal through the omnidirectional antenna to the base station, and the base station does not transmit;

region 3 in which the base station transmits a directional busy tone through the sector antenna used for the mobile station in the downlink mode, and the mobile station does not transmit; and region 4 in which the mobile station in the uplink mode transmits the reference signal through the omnidirectional antenna to the base station, and the base station does not transmit.

30. The radio communication apparatus according to claim 29, further comprising:

means for performing an uplink if no carriers are detected in region 1 and region 2 of the slot wanting an uplink, while avoiding the uplink if any carriers are detected.

31. The radio communication apparatus according to claim 29, further comprising:

means for performing a downlink if no carriers are detected in region 3 and region 4 of the slot wanting a downlink, while avoiding the downlink if any carriers are detected.

32. A control method for a radio communication apparatus that has an omnidirectional antenna and acts as a mobile station in a radio cell, the mobile station transmitting within a transmission frame divided into slots to perform multiple access, each of the slots comprising:

region 1 in which a base station transmits a directional busy tone through a sector antenna used for the mobile station in an uplink mode, and the mobile station does not transmit;

region 2 in which the mobile station in a downlink mode transmits a reference signal through the omnidirectional antenna to the base station, and the base station does not transmit;

region 3 in which the base station transmits a directional busy tone through the sector antenna used for the mobile station in the downlink mode, and the mobile station does not transmit; and region 4 in which the mobile station in the uplink mode transmits the reference signal through the omnidirectional antenna to the base station, and the base station does not transmit, the control method for a radio communication apparatus comprising:

transmitting an omnidirectional reference signal by using region 2 of a slot in the downlink mode;

transmitting the omnidirectional reference signal by using region 4 of a slot in the uplink mode;

sensing carriers in region 1 and region 2 of a desired slot when an uplink is required; and sensing carriers in region 3 and region 4 of a desired slot when a downlink is required.

33. The control method for a radio communication apparatus according to claim 32, further comprising:

performing an uplink if no carriers are detected in region 1 and region 2 of the slot wanting an uplink, while avoiding the uplink if any carriers are detected.

34. The control method for a radio communication apparatus according to claim 32, further comprising:

performing a downlink if no carriers are detected in region 3 and region 4 of the slot wanting a downlink, while avoiding the downlink if any carriers are detected.

* * * * *